United States Patent [19]
Hassinger

[11] 3,760,353
[45] Sept. 18, 1973

[54] EMERGENCY VEHICULAR WARNING SYSTEM

[75] Inventor: Donald F. Hassinger, Ann Arbor, Mich.

[73] Assignee: DV Displays Corporation, Cleveland, Ohio

[22] Filed: Oct. 18, 1971

[21] Appl. No.: 190,093

[52] U.S. Cl.................. 340/72, 200/61.47, 340/262
[51] Int. Cl............................................. B60q 1/44
[58] Field of Search........... 200/61.45, 61.47–61.53; 340/52 H, 61, 66, 67, 71, 72, 81

[56] References Cited
UNITED STATES PATENTS

| | | | |
|---|---|---|---|
| 1,921,833 | 8/1933 | McGorum | 200/61.52 X |
| 2,831,183 | 4/1958 | Womack | 340/71 X |
| 3,089,129 | 5/1963 | Nassikas et al. | 340/72 X |
| 3,221,211 | 11/1965 | Murphy et al. | 340/52 R X |
| 3,258,746 | 6/1966 | Bumpous | 340/71 |
| 3,434,106 | 3/1969 | Lawless | 340/55 |
| 3,519,987 | 7/1970 | Jania | 340/72 |

Primary Examiner—John W. Caldwell
Assistant Examiner—Kenneth N. Leimer
Attorney—Olsen and Stephenson

[57] ABSTRACT

An emergency warning device for flashing brake lights on a motor vehicle to signal adjacent vehicles that a sudden stop is being made or has been made. The device provides means for setting a predetermined deceleration rate to which the device reponds. A mercury switch closes when the predetermined deceleration is exceeded. The device utilizes a solid state switch sensor attached to the mercury switch which activates a flasher when the predetermined deceleration is achieved and maintains the flasher activated after the predetermined deceleration has subsided. A manual reset switch is provided to extinguish the solid state switch sensor when the emergency condition has passed.

4 Claims, 6 Drawing Figures

PATENTED SEP 18 1973
3,760,353
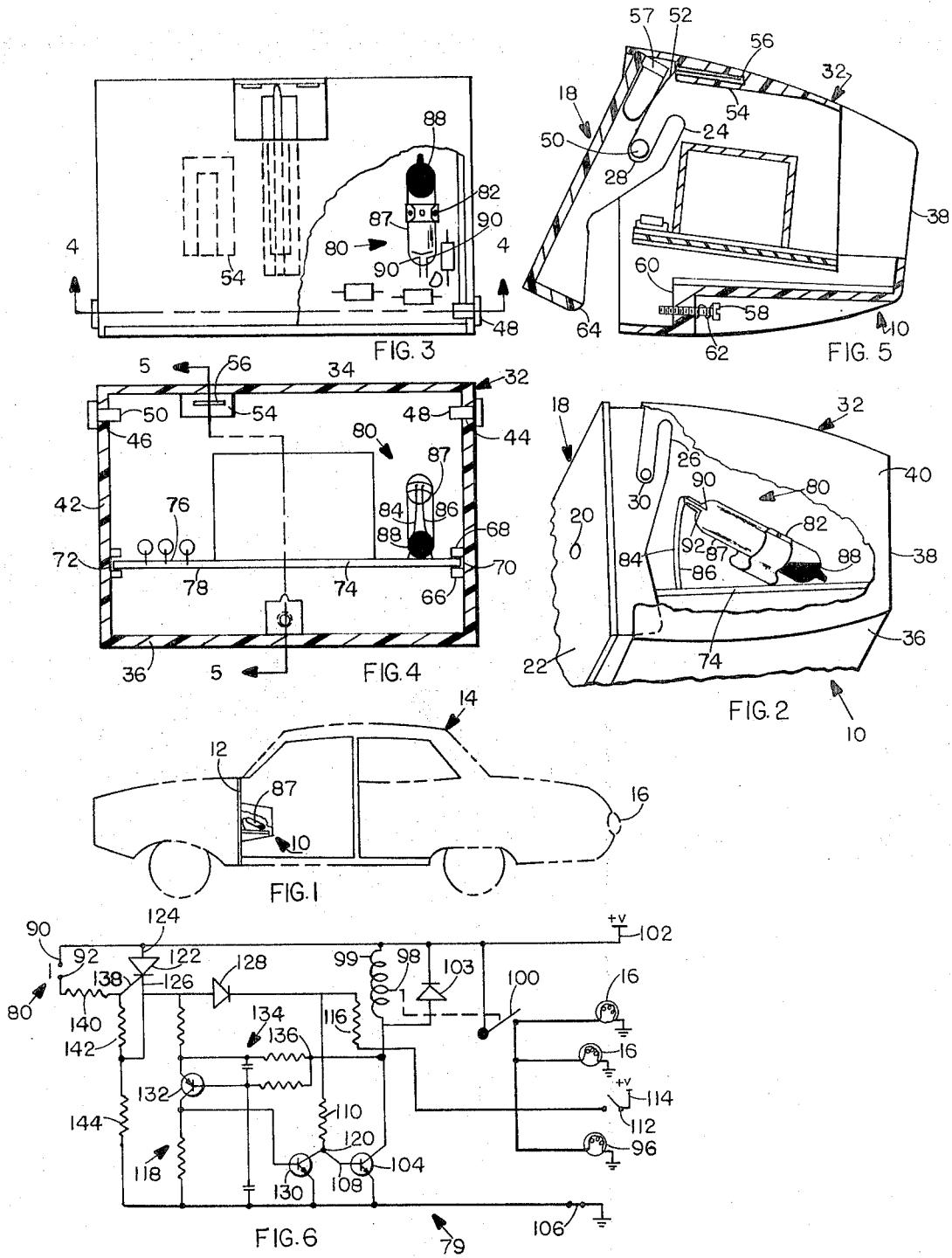
INVENTOR
DONALD F. HASSINGER
BY OLSEN AND STEPHENSON
ATTORNEYS

EMERGENCY VEHICULAR WARNING SYSTEM

BACKGROUND OF THE INVENTION

The present invention relates to an improved device for flashing brake lights on a vehicle in response to a predetermined deceleration. Ordinarily, the brake lights on a car are illuminated when the brakes are applied. A following driver has no way of distinguishing whether the brakes are being applied gradually or suddenly. The brake light indication is the same for either case. A vehicle may also be suddenly stopped by hitting an obstacle and no brake light indication will be apparent. Past systems, such as shown in U.S. Pat. No. 3,434,106 issued to Lawless, provides electrical circuitry and a deceleration switch which cooperate to flash the vehicle's brake lights when a sudden stop is encountered. Prior systems, while functionally similar to the present invention, were not readily accepted due to the size and complexity of the circuitry, the unreliability of the deceleration switch, or the inconvenience of the means employed for setting the desired deceleration.

Where mercury switches were employed, such as U.S. Pat. No. 3,089,129 issued to Nassikas and U.S. Pat. No. 3,258,746 issued to Bumpous, the switches were mounted on an individual frame for inclination adjustment. This method adds complexity and cost to the manufacturing process.

The prior art utilized latching relays to lock up the circuit as opposed to solid state devices, thus sacrificing space and reliability.

SUMMARY OF THE INVENTION

The present invention provides an emergency warning device that overcomes the shortcomings of the prior art. The device has a base which mounts on the vehicle's fire wall by any suitable means. A housing is then pivotally engaged with the base, and a novel spring and screw arrangement is provided to adjust the pitch of the housing with respect to the base and, therefore, the fire wall. A printed circuit board is slid into essentially horizontal slots along the sides of the housing. A tubular mercury switch is rigidly attached to the circuit board and inclined in the direction of travel of the vehicle. The elevated end of the switch has two electrodes embedded within the glass. Thus when the pitch of the housing is varied, the pitch of the circuit board and the tubular mercury switch is varied, and the rate of deceleration required to cause the mercury to flow "uphill" to bridge the electrodes is likewise varied. The circuit board has a solid state flasher circuit mounted on it and a silicon controlled rectifier which is turned on when the mercury switch closes and activates the flasher. The silicon controlled rectifier, once turned on, remains turned on until extinguished by interrupting its current supply by opening a manual reset switch.

The present invention thus provides an emergency warning device which is easily mounted and detached from an automobile.

The device is simply adjusted to set a predetermined deceleration rate once the device is mounted on the vehicle without disassembling the device.

The mercury deceleration switch is rigidly mounted on the circuit board within the adjustable housing for simplicity of manufacture and assurance of continued pitch setting.

The electrical circuitry utilizes solid state devices for increased reliability and decreased size.

Thus it is the object of this invention to provide an improved emergency warning device for a vehicle. Other objects of this invention will appear in the following description and appended claims, reference being had to the accompanying drawings forming a part of this specification wherein like reference characters designate corresponding parts in the several views.

FIG. 1 is a side elevational view of the warning device mounted on a vehicle;

FIG. 2 is an enlarged perspective view of the warning device with portions cut away to show internal detail;

FIG. 3 is a top plan view of the warning device partly disassembled and with portions broken away to show internal detail;

FIG. 4 is a front section view of the warning device taken along line 4—4 in FIG. 3;

FIG. 5 is a side sectional view of the warning device taken along line 5—5 in FIG. 4; and FIG. 6 is an electrical schematic of the electrical circuit of the warning device.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

With reference to the drawings, an emergency warning device 10 is shown in FIG. 1 attached to a fire wall 12 of a vehicle 14. The device 10 is electrically connected to the vehicle's brake lights 16 and flashes the brake lights 11 when the vehicle 14 decelerates rapidly.

The device 10 has a base 18 (FIG. 2) which can be secured to the fire wall 12 by inserting screws (not shown) through holes 20 to engage the fire wall 12 or by means of a suitable adhesive applied to the surface 22 of the base 18. The base 18 has an upwardly extending ear 24 (FIG. 5) which forms a slot 28. A similar ear 26 and slot 30 are formed on the opposite end of the base 18 (FIG. 2). The purpose of the ears and slots will presently appear.

The device 10 also has a housing 32 (FIG. 2) with a top 34 (FIG. 3), a bottom 36 (FIG. 2), a back 38 (FIG. 5), and sides 40 and 42 (FIG. 4).

The housing 32 has holes 44 and 46 in sides 40 and 42 respectively (FIG. 4). Pins 48 and 50 are frictionally engaged in holes 44 and 46. The pins 48 and 50 serve to pivotally engage slots 30 and 28 when the base 18 is introduced into the housing 32 as shown in FIG. 5. Once the pins 48 and 50 are seated in the slots 30 and 29, the base 18 can pivot with respect to the housing 3.

A flat spring 52 (FIG. 5) is secured to the top 34 by means of a bracket 54 with a slot 56. When base 18 is pivoted into place, the spring 52 is compressed and engages the base 18 in notch 57 (FIG. 3) and the flat spring 52 tends to cause relative clockwise rotation. An adjustment screw 58 (FIG. 5) is threaded into an upwardly projecting portion 60 of the bottom 36 and is locked by means of a spring 62. The screw 58 engages the base 18 at a lower edge 64 and thus restrains the clockwise rotation induced by the flat spring 52. When the screw 58 is advanced, the base 18 and housing 32 rotate counterclockwise relative to each other and compress the flat spring 52. When the screw 58 is retracted, the base 18 and housing 32 rotate clockwise at the urging of the flat spring 52.

The housing 32 has parallel rails 66 and 68 along side 40 which form slot 70 (FIG. 4). A slot 72 is likewise formed along side 42. A printed circuit board 74 is mounted horizontal within the housing 32 by means of the slots 70 and 72 engaging the sides of the board 74. The circuit board 74 is the standard phenolic circuit board with electrical components mounted on its upper side 76 electrically interconnected by printed circuitry on the opposite side 78 which make up an electrical circuit 79 (FIG. 6). A mercury switch 80 is rigidly mounted to the board 74 by means of bracket 82 and with lead lines 84 and 86 electrically connected to the printed circuitry of the circuit board 74. The mercury switch is a sealed glass tube 87 mounted inclined in the direction of travel of the vehicle as shown (FIG. 2) and with a drop of liquid mercury 88 within. The lead lines 84 and 86 are embedded in the upper end of the glass tube 87 to form electrodes 90 and 92. Thus, when the vehicle 14 rapidly decelerates the mercury drop "climbs up" the tube and bridges the electrodes 90 and 92.

The rate of deceleration is set by adjusting the screw 58 which tilts the whole housing 32. Since the switch 80 is rigidly mounted on the circuit board 74 which in turn is rigidly mounted within the housing 32, tilting the housing 32 tilts the switch 80 and varies the rate of deceleration required to cause the mercury 88 to bridge the electrodes 90 and 92.

The electrical circuit 79 represented schematically in FIG. 6 serves to sense the condition of the mercury switch 80 and respond by flashing the brake lights 16 and a monitor light 96 mounted within view of the driver of the vehicle 14. A relay 98 has an activating coil 99 and a normally open switch 100 which when closed connects the d.c. voltage supply 102 to the grounded brake lights and monitor lights connected in parallel. The activating coil 99 which has a parallel inductive spike damping diode 103 is connected to the voltage supply 102 at one end and is activated when its other end is connected to circuit ground through transistor switch 104 and normally closed manual reset switch 106. The transistor switch is turned on by a positive voltage being applied to its base 108 through base resistor 110. This hapens normally when a normally open brake switch 112 is closed in response to the vehicle's brake being depressed. The brake switch 112 connects the voltage supply 114 to the base 100 through brake resistor 116 and base resistor 110. When the vehicle brake pedal is depressed, the monitor light 96 goes on and stays on until the brake pedal is released.

A flasher circuit 118 is connected to the transistor switch 104 at node 120. The flasher circuit 118 is energized when a silicon controlled rectifier 122 is triggered as will be later explained thus electrically connecting the flasher circuit 118 to the voltage supply 102 as current flows in a forward direction from anode 124 to cathode 126. The flasher 118 once energized provides current to the base 108 of transistor switch 104 through blocking diode 128 and base resistor 110. A flasher transistor 130 operates to periodically ground point 120 which causes transistor 104 to turn off in response. Transistor 130 is controlled by transistor 132 which turns off and on in response to the RC timing circuit 134 charging and discharging as point 136 is alternately grounded and floated by transistor 104 changing states.

The silicon controlled rectifier 122 is triggered by current flowing in its gate lead 138. This condition is satisfied when mercury switch 80 closes in response to a predetermined vehicle deceleration and current flows through gate biasing resistors 140 and 142 which establish a voltage at the gate 138 sufficiently low to cause conduction in the gate. The rectifier once triggered continues conducting even if mercury switch 80 is subsequently opened. Conduction of the rectifier only ceases when reset switch 106 is opened thus interrupting the path from the cathode 126 through resistor 144 to ground.

What is claimed is:

1. In combination with a vehicle having brake lights, an emergency warning device for flashing said brake lights comprising a base member mounted on said vehicle, a housing pivotally mounted on said base member, a circuit board mounted within said housing, deceleration switch means comprising a container mounted on said board and inclined upwardly in the forward direction of travel of said vehicle, electrode means at the forward end of said container, a drop of mercury in said container at the rearward end thereof movable forwardly in said container in response to a predetermined deceleration of said vehicle to a position bridging said electrode means, electrical circuit means mounted on said circuit board capable of sensing the condition of said deceleration switch means and flashing the brake lights of said vehicle in response to said bridging of said electrode means and means for adjusting the position of said housing with respect to said base member to vary the inclination of said deceleration switch means to set said predetermined deceleration.

2. The combination according to claim 1, wherein said means for adjusting the position of said housing includes a screw threaded into a lower portion of said housing and engaging a lower portion of said base member and a spring attached to an upper portion of said housing and engaging an upper portion of said base member so that at the urging of said spring said base member and said housing pivot relative to each other until restrained by the engagement of said screw on said base member.

3. The combination according to claim 1, wherein said electrical circuit means comprises silicon controlled rectifier means for sensing bridging of said electrode means caused by said mercury drop flowing in response to said predetermined deceleration rate, and flasher means activated by said rectifier means when said rectifier means senses bridging of said electrode means.

4. The combination according to claim 3 further including manual switch means in said circuit means operable to deactivate said flasher means.

* * * * *